G. H. SMITH.
BEET HARVESTER.
APPLICATION FILED FEB. 24, 1908.

1,026,714.

Patented May 21, 1912.
5 SHEETS—SHEET 1.

G. H. SMITH.
BEET HARVESTER.
APPLICATION FILED FEB. 24, 1908.

1,026,714.

Patented May 21, 1912.

5 SHEETS—SHEET 4.

Witnesses

Inventor
George H. Smith
H. H. Bliss
Attorney

G. H. SMITH.
BEET HARVESTER.
APPLICATION FILED FEB. 24, 1908.

1,026,714.

Patented May 21, 1912.
5 SHEETS—SHEET 5.

Witnesses

Inventor
George H. Smith
H. H. Bliss
Attorney

UNITED STATES PATENT OFFICE.

GEORGE H. SMITH, OF BROUGHTON, OHIO.

BEET-HARVESTER.

1,026,714.  Specification of Letters Patent.  Patented May 21, 1912.

Application filed February 24, 1908. Serial No. 417,549.

*To all whom it may concern:*

Be it known that I, GEORGE H. SMITH, a citizen of the United States, formerly residing at Garden City, in the county of Finney and State of Kansas, and now residing at Broughton, in the county of Paulding and State of Ohio, have invented certain new and useful Improvements in Beet-Harvesters, of which the following is a specification, reference being had therein to the accompanying drawings.

This invention relates to improvements in machines for harvesting beets and similar vegetables.

Among the objects of the invention are the provision of improved means for removing the beet foliage and tops, improved means for removing the severed foliage and tops out of the path of the following digging mechanism, improved means for controlling the cutting mechanism, improved means for steering the machine, and improved means for forming and clearing preliminary furrows in advance of the plows of the digging mechanism.

Figure 1:
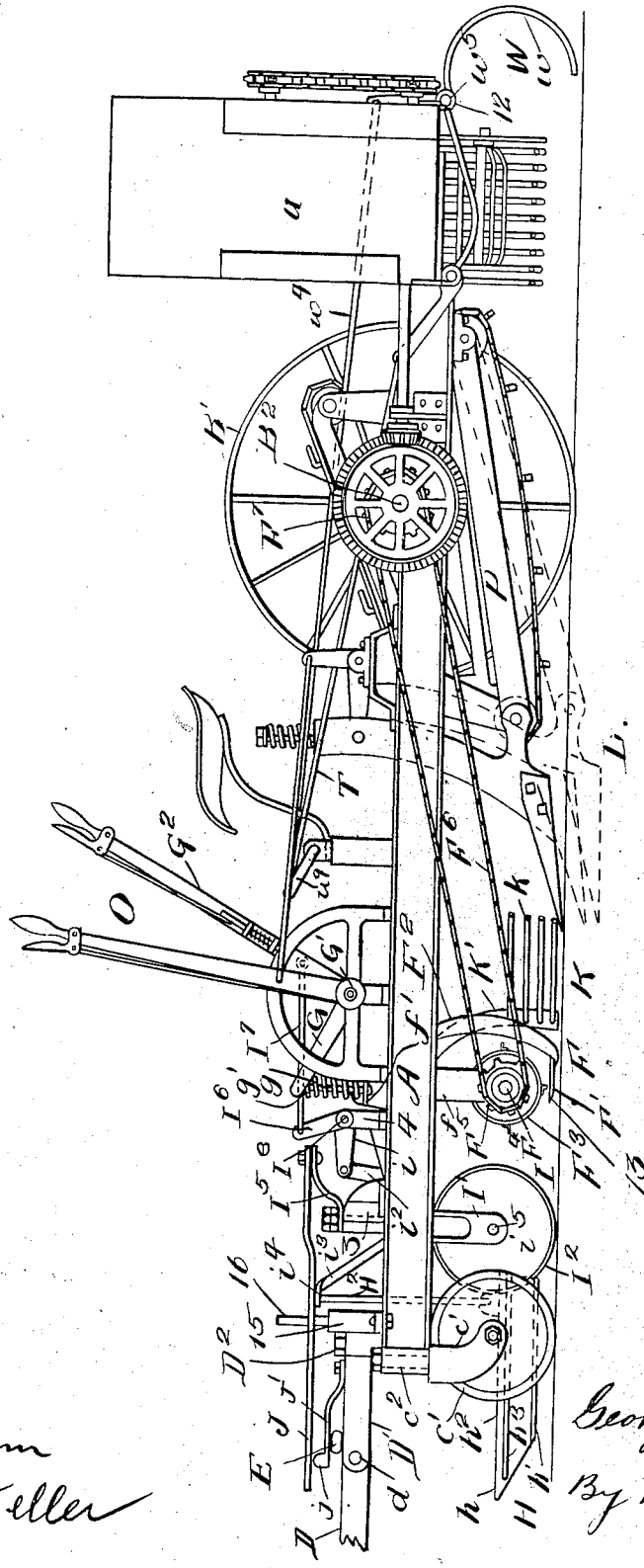
Figure 2:
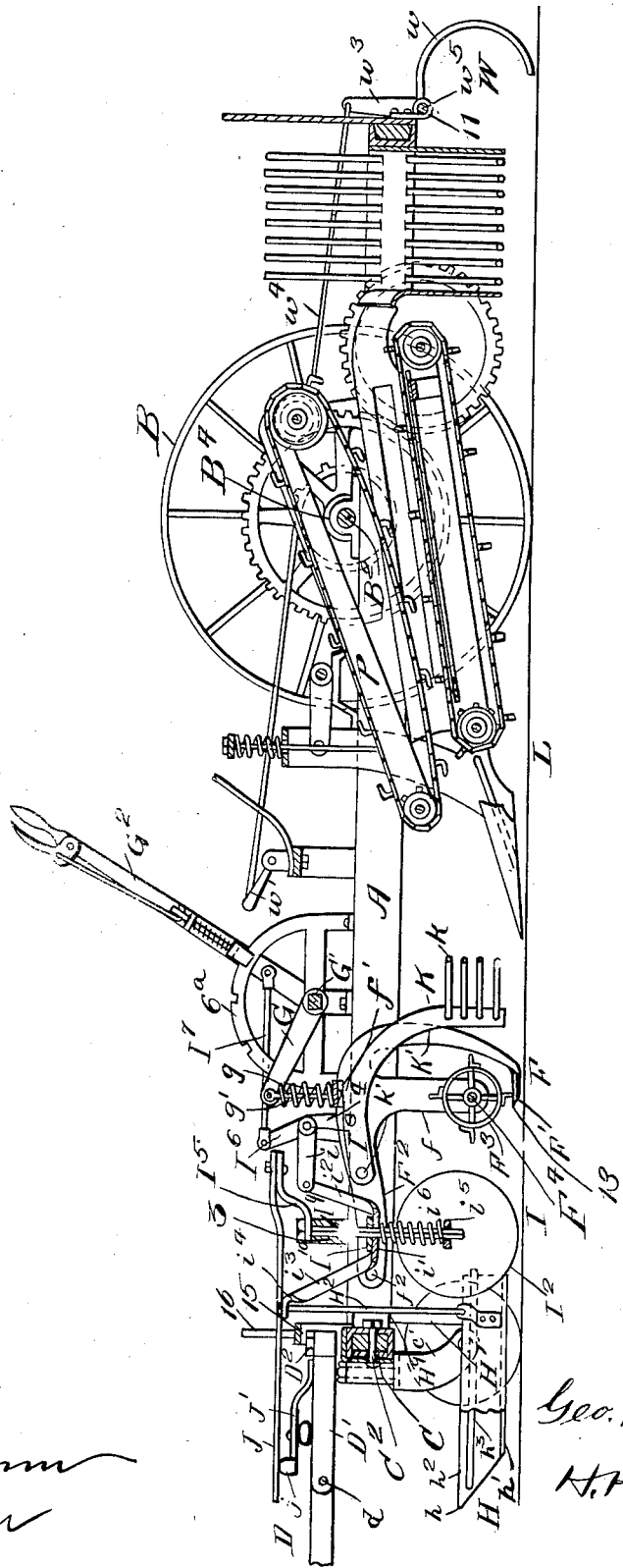
Figure 3:
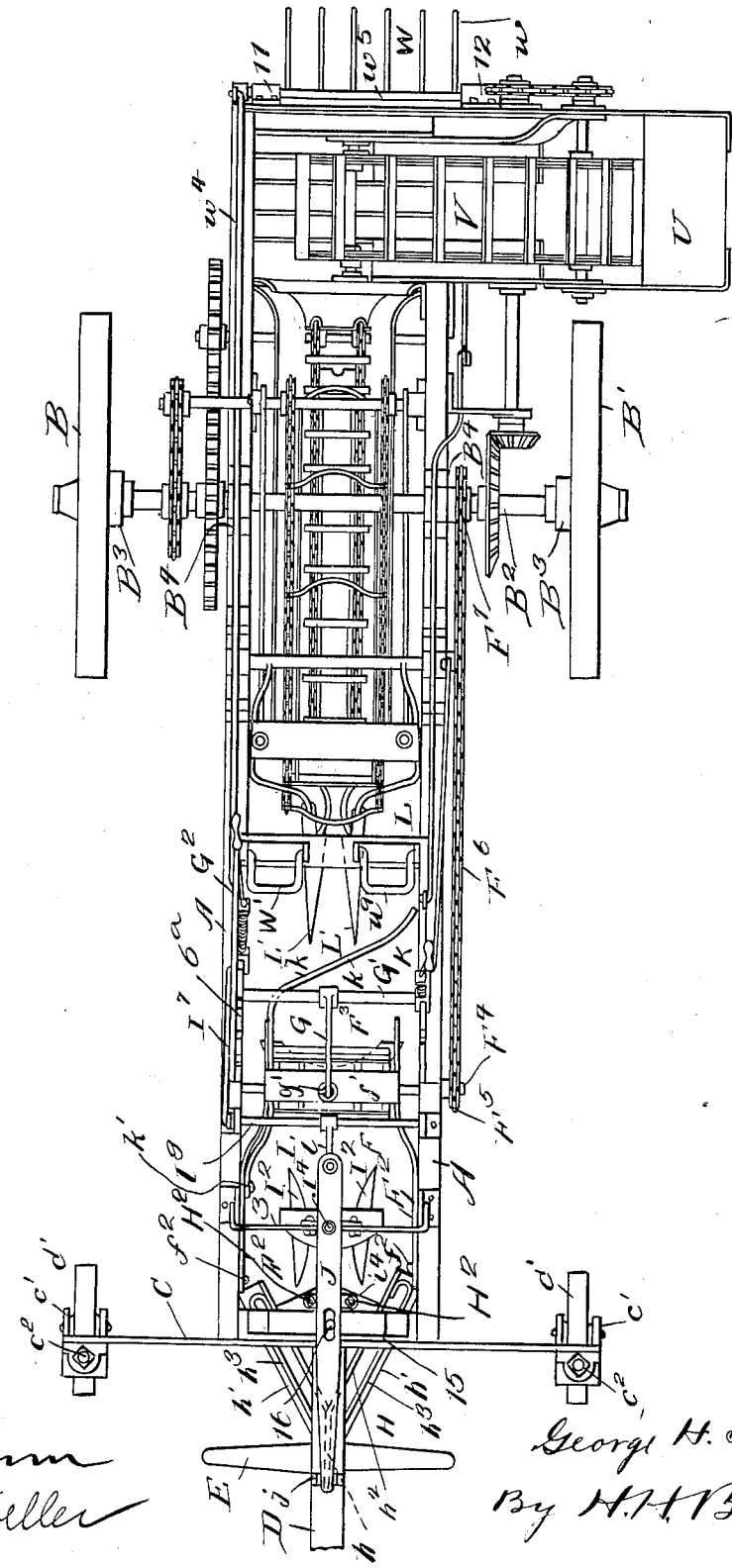
Figure 4:
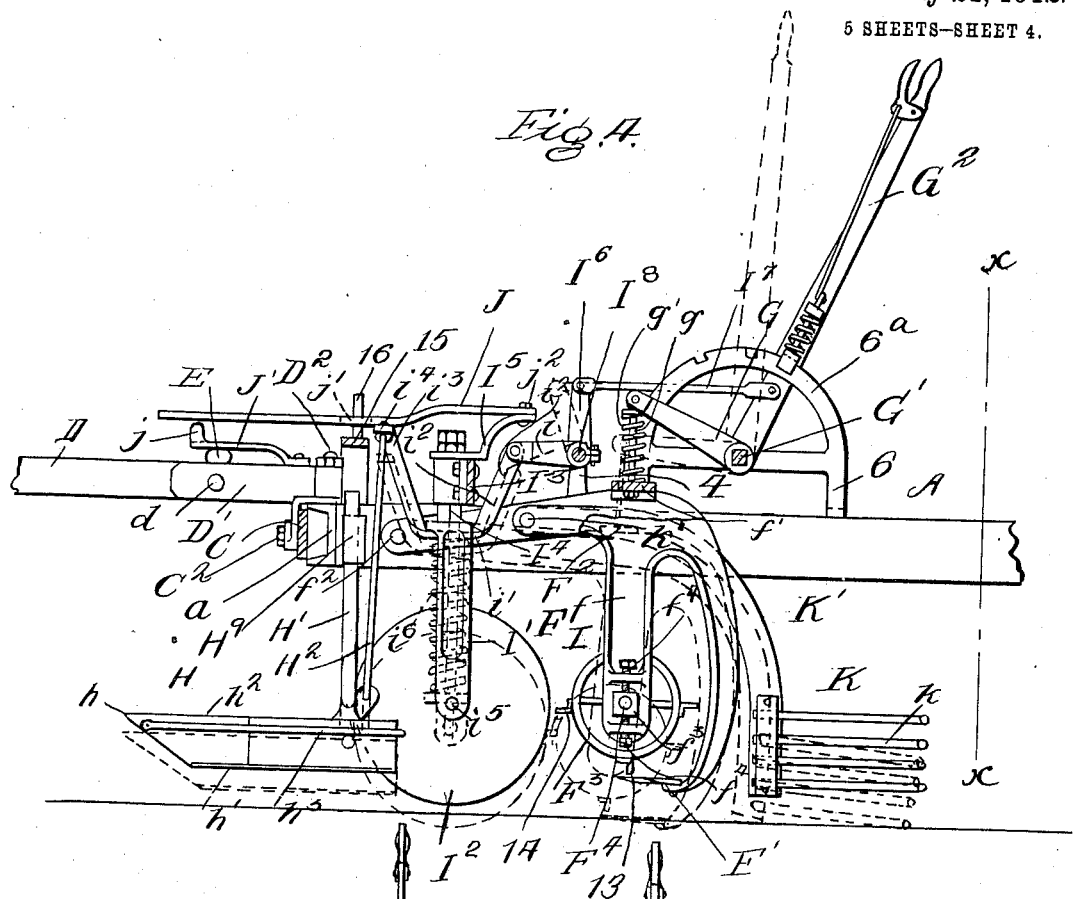
Figure 5:
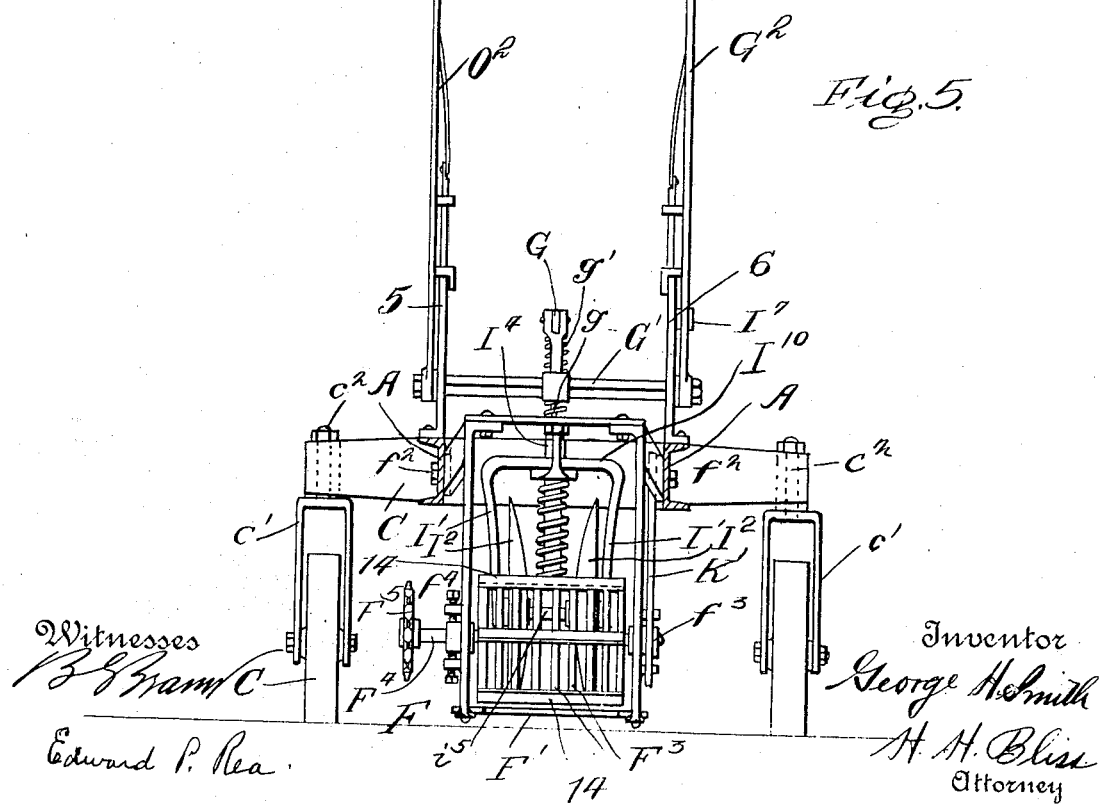
Figure 6:
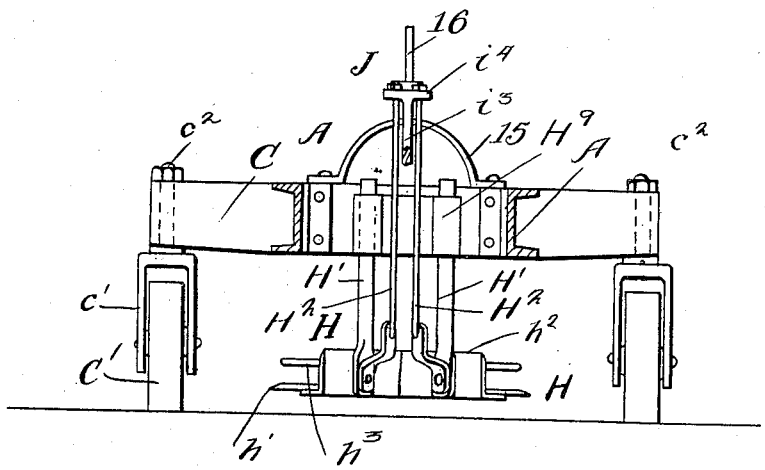
Figure 7:
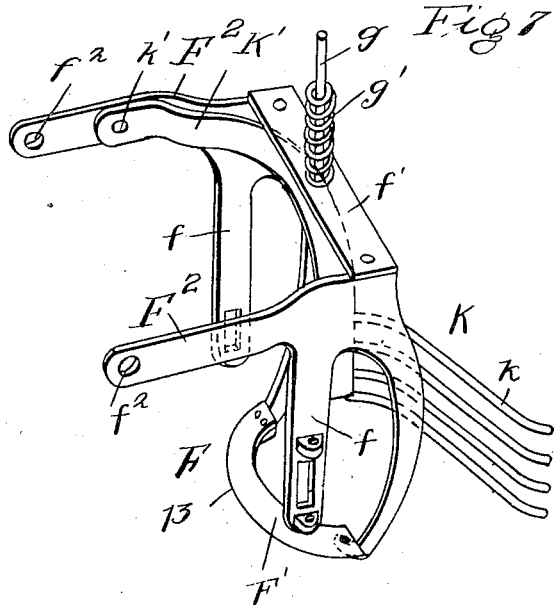
Figure 8:
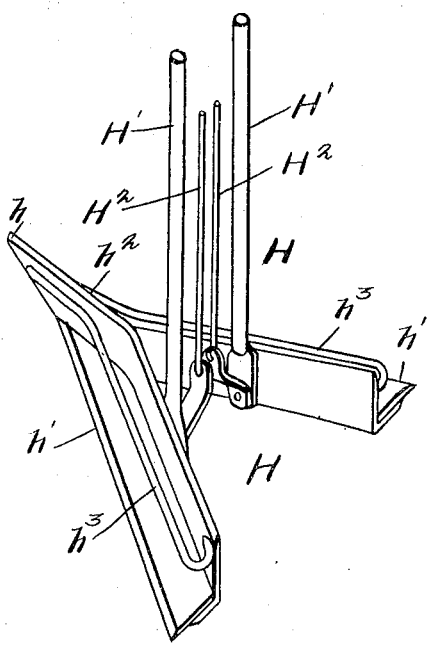

Figure 1 is a side view of a machine embodying my improvements. Fig. 2 is a longitudinal section. Fig. 3 is a top plan view. Fig. 4 is a longitudinal section of the front part of the machine on a large scale. Fig. 5 is a vertical cross-section on line $x$—$x$, of Fig. 4, some of the parts being removed. Figs. 6 to 8 show details.

In the drawings the machine is represented as having a main frame-work formed with the side bars A, A.

The main ground wheels are indicated by B, B', these being mounted upon the axle $B^2$ held in the bearings $B^4$. Between the wheels B, B' and the axle there are backing ratchet devices $B^3$, $B^3$. At the front end of the machine there is an axle-like bar C which supports caster wheels C', C', this bar being secured to the front cross-bar of the main frame by means of the pivot $C^2$. Each caster wheel is supported in a forked bracket $c'$ having a spindle $c^2$ which is pivotally connected with sleeves at the ends of the axle bar C. The draft apparatus comprises the tongue D and the whiffletree E. The tongue is connected by a horizontal pivot $d$ with the yoke D' which is secured to the front cross bar of the frame by pivot bolt $D^2$.

F indicates a cutting or topping apparatus, which comprises a horizontally arranged, relatively stationary cutter F' and a rotary holding or abutting device $F^3$. The latter is of the form of a drum having its axis arranged horizontally and mounted in a carrier having the arms $F^2$ which extend forward along the inner faces of the frame beams and are pivoted thereto at $f^2$. From the arms $F^2$ there extend downward legs $f$ which carry this rotary holding or abutting device $F^3$. At their rear ends the arms $F^2$ are turned down and each is connected to one end of the horizontal cutting device F'.

The shaft of the rotary holding device is indicated by $F^4$ and carries a sprocket wheel $F^5$.

$F^6$ is a drive chain passing over the sprocket $F^5$ and the sprocket $F^7$ on the main axle $B^2$. The shaft $F^4$ is mounted in vertically adjustable boxes $f^3$, each of which is mounted in a guide and which can be adjusted by means of the screws $f^4$, $f^4$. By these devices the operative parts of the rotary element can be brought to any position desired in relation to the horizontal cutters F'. The cutter F' is provided with a cutting edge 13 which is curved backward at its ends.

The cutting or topping mechanism just described is supported from a cross shaft G' mounted on the frame. This shaft has a lever or crank arm G which is flexibly connected by means of a link or rod $g$ with a cross bar $f'$, the latter being secured to the pivoted bars $F^2$. The link or rod $g$ passes loosely through a hole in the bar $f'$ and is adapted to move therein to a limited extent.

$g'$ is a spring interposed between the crank arm G and the bar $f'$, this spring being placed around the rod $g$.

$G^2$ is a hand-lever connected to the cross shaft G' and having a ratchet segment $6^a$ and a locking detent. By means of this lever the operator can lift up the cutting or topping implement, or can lower it to operative position. If it is necessary at any time for the cutting implement to rise while the lever is in locked position, provision is made for such movement by the sliding connection of bar $f'$ and rod $g$ in conjunction with the spring $g'$. The holding drum $F^3$ serves as a gage roller.

The whole cutting device is pivotally mounted as above described at $f^2$ and is therefore free to move up and down. Different beets will stand at different levels and as the roller drum $F^3$ engages with the beets the elevation of the cutter edge 13 will be adjusted so as to remove a definite amount from the top of the beet. This amount may be varied by adjusting the shaft $F^4$ in the boxes $f^3$.

Ahead of the cutting or topping mechanism above described there is placed a cutter adapted to remove those leaves or tops on the beets which are standing upright. It is indicated as whole by H, and is formed with horizontal cutters plates $h'$ and vertical flanges $h^2$. The cutter plates $h'$ diverge outward and backward. The vertical plates $h^2$ at the front unite in the central longitudinally arranged plate $h$, the forward edge of which tapers backward and downward to the first point of juncture of the cutting edges $h'$.

$h^3$, $h^3$ indicate guard rods or fingers which are carried by this cutter H. They are approximately parallel to the cutting edges of the plates $h'$, and are placed some distance above them. They act to throw the severed leaves or tops to the right and left and to put them in proper position for the action of the following devices in the machine. This cutting implement H is capable of rising and falling. It is guided and braced by means of one or more vertical rods H' fitted in guides $H^9$ on the main frame. The cutter is suspended on rods $H^2$ near the longitudinal central part, these being pivoted to the heel part of the cutter and extending up to a bar $i^4$ to be hereafter described. They pass loosely through this bar but are provided with nuts or heads adapted to rest upon it. When the bar is lifted the cutter H is elevated under the guidance of the rods H' and their guides. The cutter can automatically rise independently of the supporting bar $i^4$ when it is pushed up by an obstruction or unevenness of the ground.

Between the cutter H and the topping or cutting mechanism at F I interpose means such as indicated by I for severing the leaves or tops which extend out laterally from the plant, these generally lying flat upon the ground. The last said means comprise two cutting disks $I^2$. These are concavo-convex and are so arranged as to have the planes of their cutting edges diverge somewhat outward and backward, the concave side being turned outward. They are mounted upon a shaft or bar $i^5$ which at its ends is held in the legs of a fork or yoke I'.

$I^4$ is a guide bar secured to the central part of a cross bracket 3 secured to the frame. This bar $I^4$ is angular in section and passes loosely through an aperture in the central part of the axle $i^5$ of the disks $I^2$, and also through an aperture in the top cross-bar $I^{10}$ of the stirrup or yoke I'. The yoke I' is suspended or held against dropping vertically by means of the parts indicated at $i$, $i'$, $i^2$, $i^3$, $i$ being a crank arm carried by a cross rock shaft $I^8$, and $i'$ being a plate or bar connected with the crank $i$ by the arm $i^2$. The arm $i^3$ extends from the plate $i'$ to the bar $i^4$, above referred to, which receives the upper ends of the vertical rods $H^2$. The guide rod $I^4$, above mentioned, passes loosely through the aperture in the bar $i'$, the latter lying immediately below the cross bar $I^{10}$ of the yoke I' which carries the disks.

The rock shaft $I^8$ is mounted on the brackets 4 and is connected with the hand lever $G^2$ by means of a crank $I^6$ and a link $I^7$. It will be seen that when the hand lever $G^2$ is thrown backward the rock shaft $I^8$ and the crank $i$ will be turned in such way as to cause the bar $i'$ to lift the yoke I' and the disks. The connection between the disk yoke or carrier and the suspending device being loose, as aforesaid, a spring $i^6$ is interposed between the plate $i'$ and the disk axle $i^5$. Consequently the disks $I^2$ are adapted to rise when necessary, even though the plate $i'$ be locked in position, such rising being accompanied by the compression of the spring $i^6$ which will tend to again restore the disks to their normal position.

When it is desired to throw the several cutters out of action it is done by the above-described hand lever $G^2$. When this is thrown backward the parts at F are lifted as above-described; and at the same time the link $I^7$ is caused to rock the shaft $I^8$ which, in turn, through the crank arm $i$ lifts up the element composed of the arms $i'$, $i^2$, $i^3$ (rigidly secured together) and the lifting of this results in raising the disks with their fork carrier I', and also the cutter shoe H, through its supporting links $H^2$, the guide rods H' moving upward with it through the guides $H^9$. Such lifting of all of these cutter and topping elements of the mechanism becomes necessary or advisable, not only when the machine is going to and from the field, but also when it is being turned, as at the end of a row, and taken to a new line of operation. While the machine is in action and the cutting elements are in their lowermost position of operation, it is desirable that the disks $I^2$ should be inclined to the main frame at times when the tongue and draft devices are similarly inclined at an angle relative to the main frame. The draft devices assume this angular relation relatively to the main frame in following deviations to the right or the left in the beet row. By causing the disks to become inclined to the main frame and parallel to the draft devices at such times, it becomes easy to steer the machine as a whole while it is in operation. This parallelism of the disks I² and the tongue is maintained by the following devices. The bar at J is supported upon the main frame of the machine to lie in a position directly above the bar J', of the draft device adapted to be detachably engaged with the bar J. The bar J' has ears or lugs j which can at times engage laterally with the front end of the bar J. The bar J has a slot and pin connection with the main frame by means of the pin 16 carried by the front cross bar 15. The rear end of the bar J is pivotally connected to the bar I⁵ which at its forward end is rigidly secured to the guide bar I⁴. This guide bar, as before stated, passes through apertures in the yoke and axle which carry the disks I², the guide bar being rectangular in cross-section and snugly fitting into the rectangular aperture in the yoke.

When the cutting apparatus is in its lower or operative position the bar J is lowered with it and its front end is dropped to such a line that it lies between the ears j on the lock bar J'. With the parts in this position, by turning the tongue to the right or the left the disks I² are correspondingly turned so that they assume an angular position with respect to the main frame. But when the cutting apparatus is elevated it carries upward with it the bar J far enough to release its front end from the lock bar J' and therefore the tongue can be swung to the right or left relatively to the main frame and independently of the disks I². When the tongue is turned the caster wheels C' adjust themselves to correspond to the direction of the line of draft.

Immediately behind the rear topping or cutting mechanism at F there is a deflector or fender K which acts to collect and push the severed leaves or tops laterally and deposit them at places out of line of the pulling mechanism to be described. This fender mechanism K comprises rods k and the carrying arm K' to which they are clamped. The arm K' is pivoted at k' to one of the bars F² of the frame of the cutting and topping mechanism F. This mounting of the fender K upon the cutter frame leaves the fender free to rise and fall to accommodate itself to obstructions or to the uneven surface of the ground. It is at the same time, however, so attached to the cutter frame that it will be raised to clear the ground when the cutter frame is raised.

The pulling and conveying mechanism, as a whole, is indicated by L. The mechanism shown in the drawings is that shown and described in my co-pending divisional application for beet harvesters, filed April 6, 1909, Ser. No. 488,286. However, so far as certain features of my present invention are concerned, the exact form of pulling and conveying mechanism is immaterial. This mechanism may be briefly described as follows: L', L', are the pointed diggers and lifters. These are spaced apart and so located upon the machine that they will follow approximately in the furrows made by the disks I². These diggers are so mounted that they may be raised or lowered at the option of the operator, this being accomplished by the hand lever and connecting means indicated by O. P represents the conveying apparatus for carrying the beets upward and backward from the diggers. V is a supplementary conveyer adapted to receive the beets from the conveyer P and deliver them to the hopper U. This hopper has a movable bottom which may be lowered from time to time to dump the beets upon the ground. This is accomplished by means of the levers T and the foot treadle $u^9$. The leaves and tops are raked and gathered together at a transverse line at the rear of the machine by the mechanism indicated by W. It comprises curved rake teeth w secured to a rock shaft $w^5$. This shaft has a crank arm $w^3$ which is connected by means of the pitman or link $w^4$ to a crank arm w'. This crank arm w' is rigidly connected with a treadle lever W' near the treadle $u^9$ and accessible to the foot of the driver. The shaft $w^5$ is mounted in bearings 11 and 12 at the rear of the machine. This raking mechanism is preferably located as shown at the rear of the machine in order that it may in no way interfere with the proper operation of the digging mechanism and also in order that it may collect any leaves or tops which may have passed through the fender K and thence through the digging and removing mechanism. The disks I² perform several functions. As already described they serve to cut the tops or leaves which lie at the sides of the beets or which have been bent down so that they lie upon the ground. They also serve to form furrows at each side of the row of plants and along such lines as to make openings and provide clearances for the vertical legs or arms which carry the cutters F'. The diggers or pullers also follow in approximately the same line and enter the furrows which are, of course, free from loose and fibrous matter which would tend to entangle and clog the diggers and lifting mechanism. The arrangement of the disks is such that a ridge of earth is left with the plants in its center and the cutter F' moves along the top of this ridge. Furthermore, the disks by reason of their engagement with the earth serve as positive guides for the machine. The movement of the tongue D causes a corresponding movement of the disks and the machine is thus guided in the direction of the tongue. The casters C' merely roll along the top of the ground and serve as supporters. The knives at $h'$ and F' are detachable so that they can be readily removed for sharpening or for the substitution of others.

When the machine is in operation the front cutter or knife operates in a plane somewhat higher than the plane of the cutter F'. The former is intended to cut off the tops of the beet roots themselves. The lifting devices for the cutters are so constructed and have their parts so arranged that when the lifting lever $G^2$ moves forward it tends to let the parts of the rear cutting mechanism drop to a plane somewhat lower than that of the cutter in front, as shown in Fig. 4.

What I claim is:

1. The combination of the frame, the rear relatively lower horizontally acting cutter, the forward relatively higher horizontally acting cutter, and the intermediate vertically arranged cutters, substantially as set forth.

2. The combination of the frame, the rear relatively lower horizontally acting cutter, the forward relatively higher horizontally acting cutter, and the intermediate vertically acting disk cutters, substantially as set forth.

3. The combination of the frame, the rear relatively lower horizontally acting cutter, the forward relatively higher horizontally acting cutter, and the intermediate cutters adapted to move bodily to different vertical planes, substantially as set forth.

4. The combination of the main frame, the horizontally acting cutting devices carried thereby for severing the tops, and the vertically acting cutters adapted to be positioned in different vertical planes, substantially as set forth.

5. The combination of the main frame, draft devices, the horizontally acting cutter for severing the tops, the vertical acting cutters, and means connecting the vertically acting cutters with the draft devices, whereby they can be moved to different vertical positions, substantially as set forth.

6. The combination with a main frame and the draft devices, of the vertically acting cutters, means for detachably connecting the vertically acting cutters with the draft devices, and means for throwing the connecting devices out of action, substantially as set forth.

7. In a machine of the class described, the combination of the main frame, the cutter mechanism, the cutter frame pivotally connected at its forward end to the main frame, and the deflector pivotally mounted on the cutter frame at a point between the pivot and the cutter mechanism and adapted to remove the severed tops from the line of action of the machine, substantially as set forth.

8. In a machine of the class described, the combination of the main frame, the cutter mechanism, the cutter frame pivotally connected at its forward end to the main frame, the deflector pivotally mounted on the cutter frame at a point between the pivot and the cutter mechanism and adapted to remove the severed tops from the line of action of the machine, and means for raising the cutter mechanism and the deflector out of operative position, substantially as set forth.

9. In a machine of the class described, the combination of a horizontal cutter, guide bars rigidly attached to the cutter, supporting sleeves upon the main frame slidably engaging the guide bars, and lifting means attached to the cutter by means of which it may be raised at the will of the operator, substantially as set forth.

10. In a machine of the class described, the combination with a main frame and a draft tongue of a forward horizontal cutter for severing upstanding beet foliage, the rear lower horizontal cutter for severing the beet tops, intermediate vertical cutters adapted to enter and engage the ground at both sides of the beet row and to sever laterally extending beet foliage, and means for connecting the said vertical cutters with the draft tongue whereby the said cutters are maintained in substantial parallel relation with the tongue, substantially as set forth.

11. In a machine of the class described, the combination of two substantially vertical rotatably mounted disks adapted to travel at the sides of a row of beets and cut off such of the beet foliage as extends laterally from the row, the disks being so mounted as to be free to rise independently of other elements of the machine to pass over obstructions, and means whereby the operator may raise the disks out of operative position, substantially as set forth.

12. In a machine of the class described, the combination with the main frame and supporting wheels therefor, of substantially vertical rotatable disks connected to the frame by a vertical pivot and adapted to enter and engage the ground, the said disks being independent of the supporting wheels and normally positioned substantially parallel to the line of motion of the machine, a draft tongue pivotally connected to the frame, and means whereby the lateral movement of the tongue will cause a corresponding movement of the disks, substantially as set forth.

13. In a machine of the class described, the combination of substantially vertical rotatable disks connected to the machine frame by a vertical pivot, the said disks being adapted to engage the ground, a draft tongue pivotally connected to the main frame, connecting means between the tongue and the disks whereby the disks will be maintained substantially parallel to the tongue, means for raising the disks out of operative position and at the same time disconnecting them from the tongue, substantially as set forth.

14. In a machine of the class described, the combination of digging points, substantially vertical rotatably mounted disks in advance of the digging points forming guide furrows therefor and cutting fibrous material lying in their paths, the said disks being so mounted that they may be moved to steer the machine, substantially as set forth.

15. In a machine of the class described, the combination of a horizontal cutting means, a vertical cutting means, a secondary horizontal cutting means, each of the cutting means being free to rise and fall independently of the others, and means whereby all of the said cutting means may be raised out of or lowered into operative position by one movement of the operator, substantially as set forth.

16. In a machine of the class described, the combination of an advance horizontally positioned cutting device adapted to sever upstanding beet foliage, the said device being adapted to laterally deflect any foliage not completely severed, a pair of vertically positioned rotatable cutting disks behind the said horizontally positioned cutting device, each disk being adapted to sever laterally extending beet foliage at one side of the row, and a second horizontally positioned cutting device behind the said disks at a lower level than the first horizontally positioned cutting device and adapted to sever the beet tops, substantially as set forth.

17. In a machine of the class described, the combination with a main frame and a draft tongue, of a device normally substantially parallel with the line of motion of the machine, and adapted to normally enter and engage the ground, means for connecting the said device with the draft tongue adapted to maintain the device in substantial parallelism with the tongue, means for raising the device out of operative position, and means whereby the device is automatically disconnected from the tongue when raised to inoperative position, substantially as set forth.

18. In a machine of the class described, the combination of a main frame, a draft tongue, a pair of rotatable vertical disks adapted to enter the ground to engage the same, means for connecting the disks with the draft tongue for maintaining them in substantial parallelism thereto, means whereby the disks may automatically move upward and downward independently of the other elements of the machine, means whereby the operator may elevate the disks to inoperative position, and means whereby the disks are automatically disconnected from the draft tongue when in inoperative position, substantially as set forth.

19. In a machine of the class described, the combination of a main frame, a draft tongue movably connected with the frame, a forward horizontal cutting means, a rear horizontal cutting means, an intermediate vertical cutting means, each of the said cutting means being free to rise and fall independently of the others, means for connecting the vertical cutting means with the draft tongue to maintain the said means in parallel relation thereto, means whereby all of the said cutting means may be raised out of the lower into operative position by one movement of the operator, and means whereby the vertical cutting means is disconnected from the draft tongue when in inoperative position, substantially as set forth.

20. In a machine of the class described, the combination with a main frame and a draft tongue pivotally connected thereto, of digging points, substantially vertical rotatably mounted disks in advance of the digging points forming guide furrows therefor and cutting fibrous material lying in their paths, and connections between the said disks and the draft tongue whereby the disks are maintained in substantially parallel relation to the tongue, substantially as set forth.

21. In a machine of the class described, the combination with a main frame and a draft tongue pivotally connected thereto, of a forward horizontal cutting device adapted to sever the upstanding beet foliage, a pair of following vertical disk cutters adapted to enter the ground at the side of the row and to sever laterally extending beet foliage, connections between the draft tongue and the said disks whereby the disks are maintained in parallel relation to the tongue, a second horizontal cutting device behind the disk cutters and adapted to sever the beet tops, a diagonally disposed deflector behind the said top cutting device and adapted to move the severed foliage and tops out of the line of action of the machine, beet pulling and removing devices behind the said deflector, and a device behind the said pulling and removing mechanism for gathering the tops into piles on the ground, substantially as set forth.

22. In a machine of the class described, the combination of symmetrically located rearward diverging horizontally extending cutting knives meeting at a point at their forward ends, and a vertical dividing plate located between the two cutters having a diagonally forward and upward inclined forward edge, substantially as set forth.

In testimony whereof I affix my signature, in presence of two witnesses.

GEORGE H. SMITH.

Witnesses:
　WALTER T. PHILLIPS,
　JOSEPH W. FLAUGHER.